(12) United States Patent
Selz et al.

(10) Patent No.: US 8,684,744 B2
(45) Date of Patent: Apr. 1, 2014

(54) INJECTION TRAINING DUMMY

(75) Inventors: Anjan Selz, Bern (CH); Manfred Rettenbacher, Meisterschwanden (CH)

(73) Assignee: Finox AG, Burgdorf (CH)

( * ) Notice: Subject to any disclaimer, the term of this patent is extended or adjusted under 35 U.S.C. 154(b) by 0 days.

(21) Appl. No.: 13/505,911

(22) PCT Filed: Feb. 11, 2010

(86) PCT No.: PCT/EP2010/051719
§ 371 (c)(1),
(2), (4) Date: Aug. 15, 2012

(87) PCT Pub. No.: WO2011/098129
PCT Pub. Date: Aug. 18, 2011

(65) Prior Publication Data
US 2012/0301857 A1    Nov. 29, 2012

(51) Int. Cl.
*G09B 23/28* (2006.01)

(52) U.S. Cl.
USPC ............................................................ 434/267

(58) Field of Classification Search
USPC .................. 434/262, 267, 268, 270, 271, 272
See application file for complete search history.

(56) References Cited

U.S. PATENT DOCUMENTS

| | | | |
|---|---|---|---|
| 3,722,138 A | 3/1973 | Veceslav | |
| 4,481,001 A | 11/1984 | Graham et al. | |
| 4,789,340 A * | 12/1988 | Zikria | 434/272 |
| 6,336,812 B1 * | 1/2002 | Cooper et al. | 434/267 |
| 6,589,057 B1 * | 7/2003 | Keenan et al. | 434/271 |
| 7,306,465 B2 * | 12/2007 | White | 434/268 |
| 7,534,107 B2 * | 5/2009 | Bardsley et al. | 434/272 |
| 7,621,749 B2 * | 11/2009 | Munday | 434/262 |
| 7,866,984 B1 * | 1/2011 | Jawalekar | 434/268 |
| 7,931,471 B2 * | 4/2011 | Senagore et al. | 434/267 |
| 8,100,695 B2 * | 1/2012 | Duprez et al. | 434/268 |
| 8,408,920 B2 * | 4/2013 | Speller | 434/268 |
| 8,454,368 B2 * | 6/2013 | Ault et al. | 434/267 |
| 2009/0035737 A1 * | 2/2009 | Battaglia, Jr. | 434/219 |

FOREIGN PATENT DOCUMENTS

| | | |
|---|---|---|
| DE | 20 2009 007 610 U1 | 9/2009 |
| EP | 0 951 003 A1 | 10/1999 |
| EP | 1 188 444 A1 | 3/2002 |
| WO | WO 2010/149214 A1 | 12/2010 |
| WO | WO 2011/088894 A1 | 7/2011 |

OTHER PUBLICATIONS

International Search Report for PCT Application No. PCT/EP2010/051719 mailed Sep. 6, 2010.
Written Opinion of the International Searching Authority for PCT/EP2010/051719 mailed Sep. 6, 2010.

* cited by examiner

*Primary Examiner* — Kurt Fernstrom
(74) *Attorney, Agent, or Firm* — RatnerPrestia

(57) ABSTRACT

An injection training dummy, including a) a three-dimensional shell member which can be penetrated by an injection needle, and b) a closure member detachably interconnected with the shell member, wherein c) the shell member and the closure member constitute a chamber into which liquid can be injected through the injection needle, and d) the shell member and the closure member are designed such that they do not absorb the liquid.

16 Claims, 2 Drawing Sheets

INJECTION TRAINING DUMMY

CROSS REFERENCE TO RELATED APPLICATIONS

This application is a U.S. National Phase Application of PCT International Application PCT/EP2010/051719, filed Feb. 11, 2010, the contents of such application being incorporated by reference herein.

FIELD OF THE INVENTION

The present invention relates to an injection training dummy, an injection training system and a method for training an injection process.

BACKGROUND OF THE INVENTION

A whole range of liquid drugs are already administered using injection pens and comparable administering apparatus, such as for example insulin in diabetes therapy. The apparatus allow the drug to be individually dosed, but with a high degree of operational security and operational comfort—characteristics which are required in particular in self-administering, i.e. administering to oneself. The administering apparatus can also be called an injection device.

Because of the need to reduce costs, more and more therapies are being given over to self-administering. One example is that of stimulating the ovaries and consequently, by fertilising the stimulated egg cells, pregnancy using hormone treatments. Thus, for example, EP 1 188 444 B1, which is incorporated by reference, describes liquid formulations based on FSH (follicle stimulating hormone) and FSH variants.

Further medicaments suitable for self-administering are for example neuroleptic drugs (Fluphenazini decanoas), vasodilative agents (Adrenalinum), blood products (Etamsylate, Epoetin alfa, Filgrastim (G-CSF), Nadroparinum calcium, Desmopressini acetas), drugs for treating rheumatic diseases (methotrexate, etanerceptum), oncological drugs (Cladribinum, interferonum humanum gamma-1b ADN) and drugs for treating infectious diseases (herpes simplex Type 1/Type 2, human immunoglobin). Usual or preferred active agents for each group of drugs are given in brackets. Other medicaments are insulin, heparin, growth hormones, peptide hormones or medicaments for MS treatment. In general, any kind of liquid or fluid medicament can be self-administered.

The quantity of a drug which has to be administered in an injection can vary significantly from patient to patient, such as for example in said therapy for stimulating the ovaries. It should also be borne in mind that the period of treatment in other therapies can be much shorter than for example in diabetes therapy, for example only a few days or weeks, and the patients therefore also cannot gain a sense of routine in handling the respective administering apparatus.

It is therefore essential, in particular for sensitive patients and patients being new to self-administering of injections, to practise the injection process. This process can be practiced with the actual medicament to be administered or a replacement liquid such as distilled water, a placebo or any other suitable substance.

The self-administering injection process creates two sensations for the patient. The first sensation is the skin being penetrated by the injection needle and the second sensation is the handling of and the feedback by the injection device. In particular the latter sensation can be practised before the patient actually injects the medicament for the first time. For this purpose, several injection training dummies are known from the prior art.

Document U.S. Pat. No. 3,722,138, which is incorporated by reference, discloses a training aid for use in the medical arts and simulating at least a portion of a human body. The training aid includes a skin-simulating substance enclosing a flesh-simulating substance to form a replica of an extremity of a human body such as an arm. A bone-simulating substance is embedded in the flesh-simulating substance. Flexible tubes are embedded in the flesh-simulating substance to simulate arteries and veins.

Document U.S. Pat. No. 4,481,001, which is incorporated by reference, discloses a skin model for use and demonstrating or practising intradermal injection of fluids. The model is a composite laminate of a subcutaneous tissue-simulating layer made of foamed elastomer of low compression deflection and hardness, a dermis-simulating layer that is substantially nonporous and has a slightly greater hardness than the subcutaneous tissue-simulating layer and an epidermis-simulating layer made of a high tear strength, high tensile strength elastomer.

A dummy of similar design is disclosed in document DE 20 2009 007 610 U1, which is incorporated by reference.

Document EP 0 951 003 A1, which is incorporated by reference, discloses an injection practice apparatus including a casing in a curved shape, an upper wall of which is provided with an opening, with a sponge member housed inside the casing. The patient pinches up the sponge member exposed through the opening and pricks a needle of an injection syringe into a protrusion of the sponge member formed by such a pinching to dispense injection liquid.

Document US 2009/0035737 A1, which is incorporated by reference, discloses an injection training pad including a container having an opened top and a closed bottom. A lid having a hole removably engages the opened top of the container. The pad comprises a cushion made of a solid piece of foam or a sponge-like material covered by a cap made from a flexible and nonporous material to simulate human skin.

SUMMARY OF THE INVENTION

The drawback of the aforementioned injection dummies is that their reusability and level of hygiene is unsatisfactory. An aspect of the present invention relates to an injection training dummy, an injection training system and a method for training an injection process according to the independent claims to overcome these drawbacks. Advantageous embodiments are given in the dependent claims.

An injection training dummy according to an aspect of the present invention comprises a three-dimensional shell member, which can be penetrated by an injection needle, and a closure member detachably interconnected with the shell member. The shell member and the closure member constitute a chamber into which liquid can be injected through the injection needle and the shell member and the closure member are designed such that they do not absorb the liquid. The injection needle penetrating the shell member means that the tip of the injection needle completely passes the wall of the shell member, ending in the chamber into which liquid can then be injected. The chamber is preferably unfilled, which means that it does not contain any porous or sponge-like material which soaks the injected liquid up. Instead, the injected liquid is accumulated within the chamber and the chamber can be emptied by detaching the closure member.

The connection between the shell member and the closure member is liquid-tight, at least for the liquid to be injected.

With this configuration, the injection training dummy can be used repeatedly until the chamber is full. The injection training dummy can easily be emptied and cleaned. The connection is for example a positive lock in which the shell member and the closure member are held together tightly by an elastic force or elasticity, which is preferably exerted by the shell member.

The shell member and the closure member being designed such that they do not absorb the liquid can be achieved in several ways. Possible embodiments, among others, are using non-absorbing materials or coating, at least partly, the shell member and/or the closure member with an impermeable layer.

The injected liquid is sealed within the chamber of the injection training dummy. Unlike some prior art dummies comprising unsealed sponges, unintentional staining of the area surrounding the dummy can be prevented.

In a preferred utilization, the dummy is located on the part of the body at which the real injection is to be carried out later. Preferably, the closure member constitutes a lower member for facing the skin when the dummy is placed on the skin at a desired injection site when training an injection, and the shell member constitutes an upper element facing away from the skin.

In a preferred embodiment, the shell member comprises an injection wall to be penetrated by the injection needle and at least one side wall. In particular, the injection wall is opposite to the closure member, wherein the side wall connects the injection wall and the closure member. The shell member therefore has a pot-like shape or a U-shape, with the bottom of the pot or U being the injection wall and the other wall being the side wall. The opening of the shell member is then closed and/or sealed by the closure member. In a particular embodiment, the injection wall has convex shape when seen from outside of the injection training dummy. This means that the injection wall has a curvature stretching outwards. This reduces the deformation of the injection wall while forces are exerted onto it by the injection device.

Preferably, the injection wall and the closure member have congruent shapes. In a rotationally symmetric design, the injection wall and the closure member have a circular outline. In another preferred embodiment, the injection wall and the closure member have a rectangular outline.

In a preferred embodiment, the side wall is concave when seen from outside of the injection training dummy. This means that the side wall has a curvature pointing, or smoothly bulging, towards the chamber of the training dummy. With this shape of the side wall, the dummy can be easily grasped and held in place during practice.

Further preferably, the side wall is slanted. In particular, the distance between the side walls close to the closure member is wider than close to the injection wall. If the injection wall has a circular shape, then the outer diameter of the side wall at the injection wall is smaller than at the closure member. If the injection wall has a rectangular shape, then the distance between opposing side walls close to the injection wall is smaller than at the closure member. With this design, handling of the dummy is further simplified.

Preferably, the dummy is basically symmetric, for example mirror symmetric or most preferably basically rotationally symmetric. Such a symmetry eases practising with the dummy as well as disassembly and assembly.

In a preferred embodiment, the shell member has a recess for receiving the closure member, in particular in the side wall or side walls of the shell member. In such a recess, the closure member can easily be accommodated while providing a liquid-tight seal of the chamber. The recess preferably encircles a central axis of the dummy, wherein the central axis points normal to an underside of the dummy. A central axis is an axis lying in a central area of the dummy, that is within the volume enclosed by the side wall or side walls. The underside of the dummy is the side which is to be brought in contact with the skin or another surface for using the dummy. The central axis can alternatively be defined as pointing normal to a major surface, such as a disk-shaped or rectangular surface, of the closure member.

As an option, the shell member comprises an additional chamber boundary wall, or inner wall, confining the chamber and/or stiffening the dummy in its interior in a direction which is at least essentially normal to the underside of the dummy. Preferably, the additional chamber boundary wall or walls are perpendicular to the surface of the closure member. Further preferably, the inner wall extends from the injection wall to the closure member. As a result, the inner wall, as a reinforcing wall, transmits forces between the injection wall and the closure member, thus reinforcing the injection wall against forces exerted when the shell member is penetrated by the injection needle. In addition, the inner wall can exert a force onto the closure member, thus pressing the closure member against the shell member, in particular a sealing surface such as a lip, for sealing the chamber. Preferably, the height of the inner wall is slightly larger than the distance between the injection wall and the closure member. If the inner wall is a chamber boundary wall, only a part of the volume defined by the shell member is used as the chamber for holding the liquid. If the inner wall is just a reinforcement wall, then it can have any suitable shape. For example, it could comprise one or more planar walls or ribs.

Preferably, the shell member is flexible, and further preferably resiliently flexible. This means that the shell member can be (elastically) deformed for removing or installing the closure member. For example, the shell member can be widened such that the closure member can be removed from or installed into the recess in the shell member. If the shell member is resiliently flexible, it automatically returns to its original shape when the closure member was removed or installed, thus sealing the chamber. Suitable materials for the shell member are an elastomer or natural rubber. Preferably, the material is injection mouldable, such as a thermoplastic elastomer. Further preferably, the material can endure a large number of penetrations, for example more than 1000 penetrations, without (significant or permanent) damage. In an advantageous manner, the material has the property of automatically closing the cut-in caused by the penetration once the injection needle is removed.

As a further option, the shell member comprises a chamfer or grove. This chamfer or grove preferably encircles the recess in the shell structure in close vicinity and/or is located at the underside of the dummy. In an embodiment, the chamfer or grove is circular with a diameter slightly larger than the diameter of the recess in the shell member for the closure member. With the width and depth of the chamfer, the flexibility of the shell member in the area where the closure member is installed can be influenced by structural measures without modifying the properties of the shell member material. This is particularly advantageous if the shell member is formed integrally, that is as one single piece from just one material in one production step. This simplifies removal and installation of the closure member. In addition, this is advantageous for the production of the shell member, for example reducing cycle time of an injection molding.

In a preferred embodiment, the shell member comprises a strap for widening the shell member. This strap eases handling of the dummy for removing/disconnecting and installing the closure member.

In a further preferred embodiment, the closure is stiff. This means that the resilience of the closure member is higher than the resilience of the shell member, for example 10 times, 20 times, 50 times or 100 times higher. This means that the closure member is not deformed when opening or closing the dummy. Further preferably, the closure member is plain, for example disk-shaped.

In another preferred embodiment, the dummy comprises a ventilation opening for the volume enclosed by the shell member, the closure member and a surface on which the dummy is placed. This is to prevent a vacuum in this volume if the dummy is placed on a surface such as a table top, causing adherence of the dummy on the surface. Preferably, the opening is a radial cut in the shell member at the underside of the dummy, for example in the end face of the shell member.

An injection training system according to the present invention comprises an injection training dummy as described above and an injection device having an injection needle. Preferably, the injection device is the device used by the patient later on to administer the actual medicament. Further preferably, the injection device of the injection training system does not contain the actual medicament, but a replacement substance. The replacement substance can have the same properties, such as viscosity, as the actual medicament. Preferably, the viscosity of the replacement substance is (slightly) higher than the viscosity of the actual medicament. This is to compensate for the fact that the replacement substance is injected into a hollow chamber instead of into tissue.

According to the present invention, a method for training the injection process with an injection device having an injection needle comprises the steps of penetrating a shell member of an injection training dummy with the injection needle such that the tip of the injection needle extends into a chamber of the injection training dummy and injecting a liquid from the injection device into the chamber. This means that the present invention encompasses the use of an injection training dummy comprising an unfilled chamber for training or practising an injection process.

It is within the scope of the present invention to combine single or all features of the embodiments and examples given in this document to form another embodiment. Further, features not essential for performing the present invention can be omitted.

BRIEF DESCRIPTION OF THE DRAWINGS

A preferred embodiment of the injection training dummy shall be described with reference to the accompanying drawings. The figures show.

DETAILED DESCRIPTION OF THE PREFERRED EMBODIMENTS

Figure 1A:
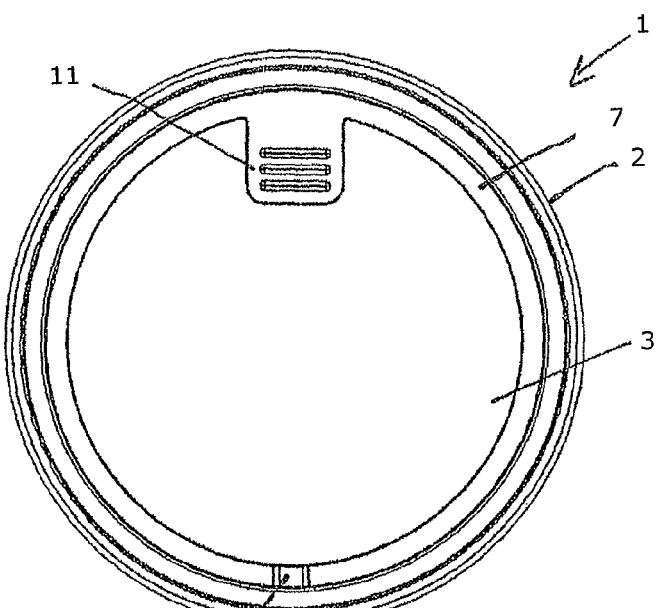
FIG. 1a a bottom view of an injection training dummy,
FIG. 1b a cross-sectional view,
FIG. 1c a top view,
FIG. 2 an inclined top view of the shell member and
FIG. 3 an inclined bottom view of the shell member.
Figure 1B:
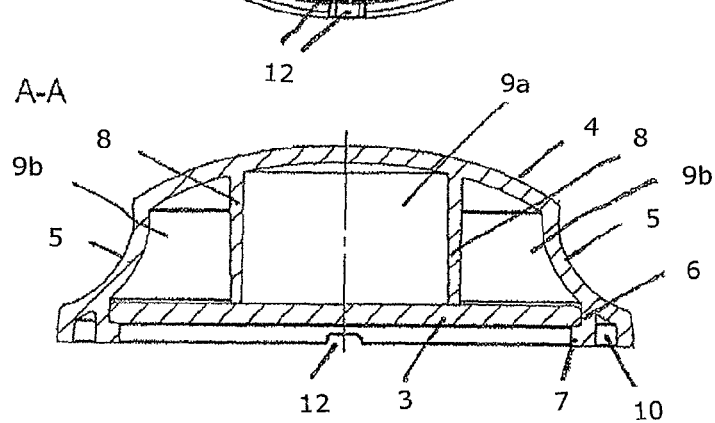
Figure 1C:
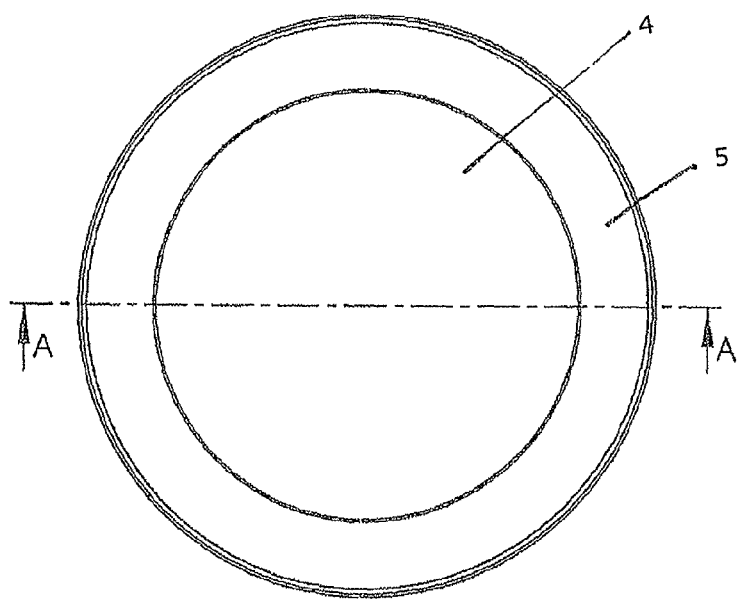

FIGS. 1a to 1c show different views of an exemplary injection training dummy 1. FIG. 1a shows a bottom view, FIG. 1c shows a top view and FIG. 1b shows a cross-sectional view along the intersection line A-A shown in FIG. 1c.

The injection training dummy 1 consists of a shell member 2 made of a flexible material, like an elastomer or natural rubber, and a closure member 3. The closure member is a circular disc made from a stiff material such as metal or plastic.

Figure 2:
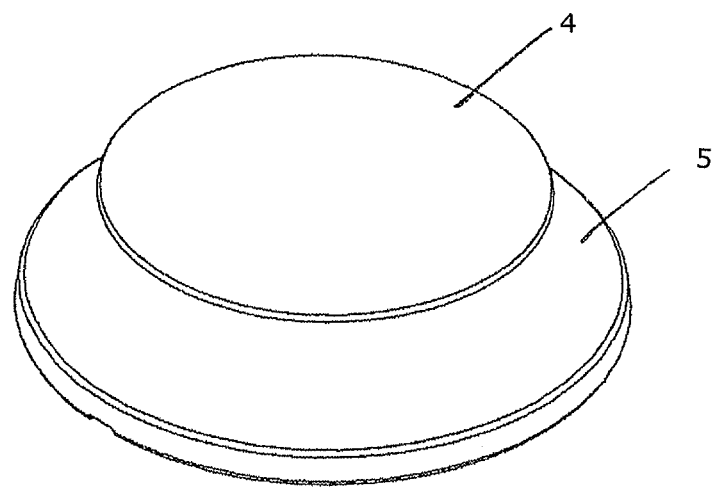

The exemplary injection training dummy 1 is basically rotationally symmetric. This means that the shell member 2 has a pot-like or bell-like outer shape. The shell member 2 comprises an injection wall 4, which can be compared to the bottom of the pot, and a circular side wall 5, as can be seen from FIGS. 2 and 3. The injection wall 4 has a convex shape, which means that it is curved outwards. The side wall 5, which can also be called lateral surface, is concave, which means that it is curved inwards. In addition, the side wall 5 is slanted, which means that the outer diameter of the side wall near the injection wall is smaller than at the other end where the closure member 3 is located. With this design, the injection training dummy can easily be grasped and handled.

At the end of the side wall 5 facing away from the injection wall 4, the shell member 2 has a recess 6 shaped like a grove to receive the closure member 3. The recess 6 is bordered on one side by the side wall 5 and on the other side by a ring-like lip 7. As can be seen in FIG. 1b, the lip 7 extends radially inward along the surface of the closure member 3 and has an inner diameter slightly smaller than the diameter of the closure member 3. The closure member 3 is therefore embraced by the lip 7, thus being interconnected with the shell member 2 in liquid-tight manner.

Figure 3:
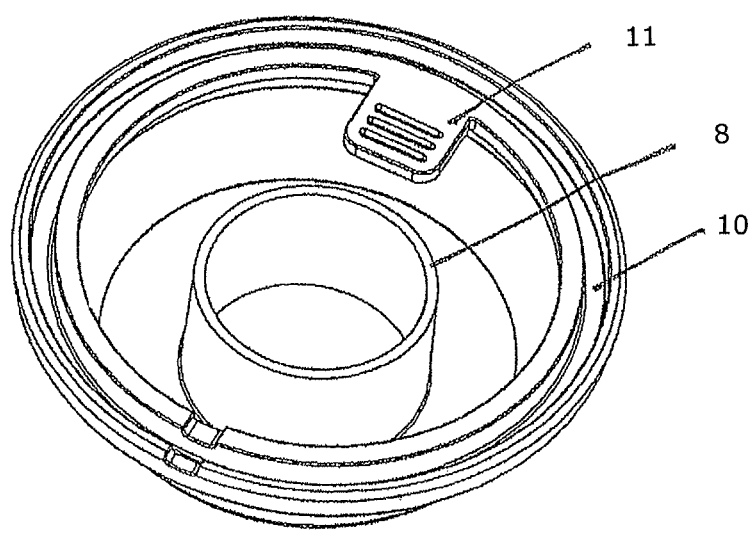

As can be best seen from FIGS. 1b and 3, the shell member 2 also comprises an optional inner wall or reinforcement wall 8 having the shape of a hollow cylinder. As an alternative, the reinforcement wall 8 could have the shape of a truncated hollow cone or any other shape. In the present embodiment, the height of the reinforcement wall 8 is slightly larger than the distance between the facing sides of the injection wall 4 and the closure member 3. One end of the reinforcement wall 8 is supported by the closure member 3, while the other end reinforces the injection wall 4 to generate a suitable resistance of the injection wall 4 against the injection needle of an injection device over its whole surface. At the same time, the reinforcement wall 8 presses the closure member 3 against the lip 7 to ensure that there is a tight seal between them. As an alternative, the height of the reinforcement wall 8 could be equal to or smaller than the distance between the facing sides of the injection wall 4 and the closure member 3. In this case, the injection wall 4 moves the reinforcement wall 8 against the closure member before it supports the injection wall 4. The injection wall is therefore slightly deformed before the reinforcement becomes effective.

The shell member 2 and the closure member 3 constitute a chamber 9 into which a liquid can be injected through the injection wall 4. In the present embodiment, the chamber 9 is divided into a first volume 9a within the reinforcement wall 8 and a second volume 9b between the side wall 5 and the reinforcement wall 8. The two volumes 9a and 9b can optionally be connected by apertures in the reinforcement wall 8.

As can be best seen in FIGS. 1a and 3, the rotational symmetry of the injection training dummy 1 is broken by a strap 11 and a cut 12. The strap 11 is an extension of the lip 7 facing radially inwards. By handling the strap 11, the shell member 2 can be deformed to remove or install the closure member 3. The cut 12 is a radial cut in the end face of the shell member 2 opposite to the injection wall 4. Optionally, the radial cut 12 is located radially opposite to the strap 11 as in the present embodiment. This cut 12 enables ventilation and inhibits the formation of a vacuum between the dummy 1 and a surface on which the dummy 1 is placed, thus preventing suction forces that could impair the handling of the dummy.

In the end face of the shell member 2 opposite to the injection wall 4, there is a circular grove or chamfer 10 between the lip 7 and the outer circumference of the shall member 2. At this end, the side wall 5 widens so the dummy 1 can be safely pressed against a surface such as skin. If the area between the side wall 5 and the lip 7 was completely filled and there was no chamfer 10, the shell member 2 would be rather stiff in this section. With the chamfer 10, the lower end of the shell member 2 remains flexible enough to be deformed for removing and installing the closure member 3 in the recess 6. In addition, if the shell member 2 is produced by injection molding, the cycle time can be reduced and the fabrication of the undercut is simplified.

Together with an injection device having an injection needle, the injection training dummy forms an injection training system. For training the injection process, the user or patient penetrates the shell member 2 of the injection training dummy 1 with the injection needle such that the tip of the injection needle extends into the chamber 9. He then injects a liquid from the injection device into the chamber 9. This can be done repeatedly, thus accumulating the injected liquid in the chamber 9. Since the shell member 2 and the closure member 3 are impermeable to the liquid, the liquid cannot leak out of the injection training dummy 1. This prevents a smell as well as staining of the area surrounding the injection training dummy, in particular the clothing of the user or patient.

In general, any king of injection device can be used with the injection training system. Injection devices can range from simple, manually operated syringes to complex auto injectors with an automated control of the injection process steps. In particular, the injection devices as described in the Patent Application PCT/EP2009/057934, filed on Jun. 24, 2009, and published as WO 2010/149214 A1, or the Patent Application PCT/EP2010/050642, filed on Jan. 20, 2010, and published as WO 2011/088894 A1, can be used. Both applications, filed by the applicant of the present application, are hereby incorporated by reference.

For emptying the chamber 9, the user pulls the strap 11 and therefore deforms the shell member 2. The closure member 3 can then be removed from the recess 6 in the shell member. The liquid accumulated in the chamber 9 can then be disposed and the injection training dummy 1 can be cleaned. The injection training dummy 1 can then be reassembled for further use.

Though the injection training dummy 1 of the exemplary embodiment is described as having a circular basic shape, any other suitable shape is within the scope of the present invention. In particular, the basic shape, i.e. the shape of the injection wall 4 and the closure member 3, can be rectangular or triangular.

Preferably, the thickness of the injection wall 4 and/or the side wall 5 is less than or equal to 3 mm. The height of the injection training dummy 1, that is the extent perpendicular to the surface, parallel or along the side walls 5, of the closure member 3, is preferably between 2 and 5 cm, preferably 3 cm. The diameter of the injection training dummy 1, that is the extent perpendicular to the height dimension, is preferably between 5 and 15 cm, for example 8.8 cm.

The invention claimed is:
1. An injection training dummy comprising:
    a) a three-dimensional shell member which can be penetrated by an injection needle, and
    b) a closure member detachably interconnected with the shell member, wherein
    c) the shell member and the closure member constitute a chamber into which liquid can be injected through the injection needle, and
    d) the shell member and the closure member are designed such that they do not absorb the liquid,
    wherein the shell member comprises an additional chamber boundary wall or inner wall confining the chamber and/or stiffening the dummy in its interior in a direction which is at least essentially normal to an underside of the dummy.

2. The injection training dummy of claim 1, wherein the closure member constitutes a lower member for facing the skin when the dummy is placed on the skin at a desired injection site when training an injection, and the shell member constitutes an upper member facing away from the skin.

3. The injection training dummy as claimed in claim 1, wherein the shell member comprises an injection wall to be penetrated by the injection needle and at least one side wall.

4. The injection training dummy as claimed in claim 3, wherein the side wall is concave.

5. The injection training dummy as claimed in claim 3, wherein the side wall is slanted.

6. The injection training dummy as claimed in claim 1, wherein the dummy is symmetric.

7. The injection training dummy as claimed in claim 6, wherein the dummy is mirror symmetric or rotationally symmetric.

8. The injection training dummy as claimed in claim 1, wherein the shell member has a recess for receiving the closure member, the recess encircling a central axis of the dummy, the central axis of the dummy pointing normal to an underside of the dummy, wherein the underside is the side of the dummy to be placed on a surface such as skin.

9. The injection training dummy as claimed in claim 8, wherein the shell member comprises a chamfer which encircles the recess in close vicinity and/or is located at an underside of the dummy.

10. The injection training dummy as claimed in claim 1, wherein the shell member is resiliently flexible.

11. An injection training dummy comprising:
    a three-dimensional shell member which can be penetrated by an injection needle, and
    a closure member detachably interconnected with the shell member,
    wherein the shell member and the closure member constitute a chamber into which liquid can be injected through the injection needle, and the shell member and the closure member are designed such that they do not absorb the liquid, and
    wherein the shell member is resiliently flexible and comprises a strap for widening the shell member to remove the closure member from the shell member.

12. The injection training dummy as claimed in claim 1, wherein the closure member is stiff.

13. The injection training dummy as claimed in claim 1, wherein the closure member is planar.

14. The injection training dummy as claimed in claim 1, comprising a ventilation opening for the volume enclosed by the shell member, the closure member and a surface on which the dummy is placed.

15. An injection training system, comprising an injection training dummy as claimed in claim 1 and an injection device having an injection needle.

16. A method for training the injection process with an injection device having an injection needle, comprising:

a) penetrating a shell member of an injection training dummy with the injection needle such that the tip of the injection needle extends into a chamber of the injection training dummy and
b) injecting a liquid from the injection device into the chamber, wherein the shell member comprises an additional chamber boundary wall or inner wall confining the chamber and/or stiffening the dummy in its interior in a direction which is at least essentially normal to an underside of the dummy.

\* \* \* \* \*